(12) United States Patent
Knudsen et al.

(10) Patent No.: US 8,308,603 B2
(45) Date of Patent: Nov. 13, 2012

(54) LINEAR ACTUATOR

(75) Inventors: Martin Kahr Knudsen, Sydals (DK); René Sørensen, Gråsten (DK); Anders B. Lorenzen, Åbenrå (DK)

(73) Assignee: Linak A/S, Nordborg (DK)

( * ) Notice: Subject to any disclaimer, the term of this patent is extended or adjusted under 35 U.S.C. 154(b) by 251 days.

(21) Appl. No.: 12/735,305

(22) PCT Filed: Jan. 12, 2009

(86) PCT No.: PCT/DK2009/000005
§ 371 (c)(1),
(2), (4) Date: Jul. 1, 2010

(87) PCT Pub. No.: WO2009/086834
PCT Pub. Date: Jul. 16, 2009

(65) Prior Publication Data
US 2010/0282009 A1  Nov. 11, 2010

(30) Foreign Application Priority Data

Jan. 12, 2008 (DE) .................................. 2008 00045
Jan. 12, 2008 (DK) .................................. 2008 00048
Jan. 12, 2008 (PA) .................................. 2008 00044

(51) Int. Cl.
  *F16H 57/08* (2006.01)
(52) U.S. Cl. ..................................... 475/331; 475/150
(58) Field of Classification Search .................. 475/149, 475/150, 331, 154
See application file for complete search history.

(56) References Cited

U.S. PATENT DOCUMENTS

| 3,693,759 A | | 9/1972 | Schindel |
| 5,595,089 A | * | 1/1997 | Watanabe et al. ............. 74/89.34 |
| 6,158,295 A | * | 12/2000 | Nielsen ......................... 74/89.38 |
| 2010/0032910 A1 | * | 2/2010 | Feldmeier ..................... 279/140 |

FOREIGN PATENT DOCUMENTS

DE  3145217  5/1983

OTHER PUBLICATIONS

English Abstract of DE3145217.

* cited by examiner

*Primary Examiner* — Justin Holmes
*Assistant Examiner* — David J Hlavka
(74) *Attorney, Agent, or Firm* — Dykema Gossett PLLC

(57) ABSTRACT

A linear actuator comprising a spindle (5) with a spindle nut (6), where the spindle (5) is driven by an electric motor (2) via a transmission (3,4), comprising a planetary gear (4). The construction is constructed in such a way that the spindle (5) is lead through the transmission (3,4) and is embedded by means of a ball bearing (20) in connection with a rear mounting (10), causing the axial forces to be lead through the transmission (3,4) via the spindle (5) and the ball bearing (20) to the rear mounting (10). This means that the construction is simpler and less voluminous and that the axial forces, moreover, are not transferred to the transmission.

15 Claims, 3 Drawing Sheets

LINEAR ACTUATOR

BACKGROUND OF THE INVENTION

1. Field of the Invention

The invention relates to a linear actuator including an electric motor, a gear housing, a transmission including a planetary gear having a sun wheel, a planetary wheel holder with planetary wheels in mesh with the sun wheel, a toothed rim in the gear housing where the planetary wheels are in mesh with the toothed rim, a spindle in connection with the transmission, a spindle nut on the spindle, and a bearing for embedding an end of a shaft of the spindle.

2. The Prior Art

Linear actuators are well-known components for use in machines and control devices just as they are widely used within the hospital and care sectors, where they are used for adjustable furniture such as beds as well as being used in furniture in general. Another use is adjustable tables, where linear actuators are part of the construction of lifting columns. In all the applications mentioned above, the linear actuator transfers a force between the attachment points in the actuator, typically a rear and front mounting, respectively connected to the rear of the cabinet and the spindle nut, respectively, either constructed directly in the spindle nut or in the front of a tubular activation element connected to the spindle nut.

The construction of linear actuators, which can transfer the forces between the two attachment points without overloading the transmission and thus causing wearing, is difficult and often results in the construction being complicated and voluminous. This is particularly the case where the linear actuator is equipped with a transmission, which comprises a planetary gear.

WO 98/30816 to Linak A/S discloses a linear actuator where the transmission comprises a planetary gear. The solution is as far as it goes fine in that precautions are taken, which leads the axial forces from the spindle around the transmission to the rear mounting. This is realized in that the actuator is equipped with a special metal frame, in which the bearing for the spindle is placed in front of the transmission, and where the frame is connected to the rear mounting by metal rods. The metal rods are lead around the transmission and surround this. Moreover, the spindle is connected to the transmission with a claw clutch, by means of which the transmission is freely suspended and thus is not exposed to axial forces in connection with when the actuator carries a load. As it appears, the construction solves the problem, but in a complicated manner, which is difficult to manufacture as it contains many components. Many components mean more expenses for material and production. Moreover, the structure with the frame surrounding the transmission means that the linear actuator becomes voluminous, which is not desirable, as a compact linear actuator is easier to integrate in an application and easier to handle.

The purpose of the invention is to provide a solution to the outlined problem, i.e. to achieve a more compact linear actuator, which moreover is very simple in its construction, but still is capable of leading the axial forces in the actuator around the transmission.

SUMMARY OF THE INVENTION

This is achieved according to the invention in that the shaft end of the spindle is lead freely through the transmission and connected to the bearing for the spindle so that the axial forces are lead around the planetary gear and directly to the bearing. In that the actuator in an embodiment comprises a rear mounting and that the bearing is located in the gear housing somewhere between the transmission and the rear mounting directly or indirectly against this, the axial forces are lead directly to the rear mounting. By leading the spindle through the transmission, the voluminous construction with an external metal frame, which leads the axial forces around the transmission, is avoided. Moreover, the connection between the spindle and transmission may be constructed in a simpler manner than the claw clutch in WO 98/30816 A2 mentioned above, in that it is constructed as a spline connection between the spindle and the planetary wheel holder. This means that the planetary wheel holder follows the rotation of the spindle, but may be displaced axially on the spindle, for which reason no axial forces in the actuator are transferred to the transmission. The axial forces are lead directly through the spindle and then exit through the ball bearing to the rear mounting. The axial forces are therefore lead from the front mounting to the spindle nut and further on to the rear mounting via the spindle and are thus not exposed to the transmission of the actuator.

Even though the spindle is lead through the transmission, it is not secured axially to any of the components in the transmission. The sun wheel of the planetary gear is thus embedded on the spindle, which provides free movability for the spindle in the axial direction.

Particularly expedient, this is constructed in that the connection between the planetary wheel holder and the spindle is a bushing, which surrounds the spindle over a length of the spindle and that the spindle and the bushing over at least part of the length of the bushing are provided with means for securing each other against mutual rotation. In this way, the bushing is locked to the spindle in terms of rotation and participates in the rotation of the spindle, but may be displaced axially relative to each other. In that the bushing moreover has means for securing the planetary wheel holder against rotation relative to the bushing; the planetary wheel holder will be locked to the bushing and thus also to the spindle in connection with rotation.

When the bushing further forms a stop for movement of the planetary wheel in the axial direction in at least one direction, it indicates the axial movement of the planetary wheel holder relative to the spindle. This clearance is, however, large enough for the planetary wheel holder never to be limited by this during normal operation so that the axial forces will not be able to be transferred to the transmission. That the unit is constructed in this way is in terms of production expedient in connection with the spline connection between the spindle and the bushing.

The bushing with the spline connection between the spindle and the planetary wheel holder is on the outer surface at least over a distance processed so that it functions as a slide bearing for the sun wheel embedded on the bushing. Where the sun wheel is directly embedded on the spindle, it is achieved that when the sun wheel is embedded on a bushing secured to the spindle that the bushing as a slide bearing centers and supports the sun wheel in its position. This construction provides free movement for the sun wheel in the axial direction. No axial forces are thus transferred from the spindle to the sun wheel.

When the sun wheel is embedded in connection with a transversal wall in the cabinet or the gear housing and the bushing is lead through the wall and on the other side of the wall is in connection with an extension, which is connected to the bushing by means of a spline connection, the spindle is extended through the wall so that the axial forces are efficiently lead through the spindle and all the way through the transmission without transferring the axial forces to the transmission. In that the bearing is in connection with the extension, the forces are thus lead from the spindle through the extension and to the bearing where they run further on to the rear mounting through the cabinet alternatively the gear housing.

In case the actuator is equipped with a spindle which is self-locking or on the verge of being self-locking, the actuator may further be equipped with a braking device which may be located between the bearing and the rear mounting. The spindle is thus axially with the shaft end brought to be supported on at least one brake disc. In that the braking device is embedded in a needle bearing, which only allows rotation in one direction, it is achieved that the braking device is released when the actuator performs axial forces in connection with moving a load. When the motor is stopped, the braking device will be activated and cause friction against the movement and thus prevent the spindle from rotating and retain the load in the given position. The braking force is balanced, so that it may be overcome by the motor when lowering the load. In that the spindle is connected to the planetary wheel holder by means of a spline connection with the possibility of axial displacement, this possibility for displacement will mean that wearing of the brake disc merely displaces the spindle axially relative to the transmission and still maintains the full braking ability. This is a further advantage of the construction of the actuator, where the spindle is lead through the transmission without transferring the axial forces to the rear mounting via the transmission.

As it appears the invention provides a solution, which discloses how the axial force in a linear actuator may be transferred from a front mounting to a rear mounting bypassing the transmission, and moreover achieves a simple solution with a more compact actuator.

In a further embodiment, the gear house has a wall in connection with the driven gear wheel and the wall and the gear wheel are constructed so that the wall functions as centering and support for the gear wheel.

A solution is thus provided, which ensures that the driven gear wheel, typically a worm wheel in mesh with a worm on the electric motor, is secured in the correct mesh with a corresponding part of the transmission so that the gear wheel may transfer the forces to the transmission and further ensure that mechanical noise is minimized and forced wearing is avoided. Moreover, it is a simple solution, which is both inexpensive to produce in terms of direct material expenses, but also optimizes the production in terms of processes and time consumption.

In a more specific embodiment, the cross wall in the gear housing is constructed with a collar intended for carrying and centering the gear wheel, which is equipped with a recess on the axial center line thereof, which functions as a counter part for the collar on the gear housing. In this way the gear wheel is embedded on the collar of the gear housing and is thus both centered and supported in its position. Moreover, the worm, also embedded in the gear housing, both at the mounting of the motor on the gear housing, but also in the other end of the worm at an embedment in a bearing, preferably a slide bearing in the gear housing. Thus, the worm wheel, supported by the collar on the gear housing, is held in correct mesh with the worm, for which reason the outlined problem is solved. Moreover, the solution is simpler and more inexpensive to realize in a production, where the cross wall in the gear housing may be used as support during the assembly process.

The supporting arrangement on the gear housing could instead of being a collar could be a recess, and that the recess on the driven gear wheel in stead could be constructed as a collar. They are still complimentary parts, which can retain the worm and the worm wheel in mutual mesh, where the means are located in connection with the wall.

The worm wheel is further supported in its position in that the spindle is lead through the worm wheel in the axial center line of the worm wheel and thus functions as a supporting arrangement, which retains the worm wheel in mesh with the worm. Where the worm wheel is mounted directly on the spindle and is secured against rotation relative to the spindle, the embedment of the spindle will contribute thereto that the worm wheel is supported and retained in its correct position in mesh with the worm on the electric motor.

In an embodiment, the spindle is equipped with a bushing, which functions as a slide bearing, which when adapted to the hollow in the worm wheel functions as a supporting arrangement retaining the worm wheel in mesh with the worm. This solution is particularly expedient in connection with planetary gears, as the spindle is not directly connected to the worm wheel, but to the successive part of the transmission.

In a solution where the transmission comprises a planetary gear, the worm wheel is constructed as a sun wheel i.e. that the sun wheel is designed with an external toothed rim in mesh with planetary wheels located in a planetary wheel holder, but also with teeth in mesh with the worm on the electric motor. As the planetary wheel holder with planetary wheels surrounds both a part of the sun wheel but also the spindle and is secured to the spindle in connection with rotation of the spindle, the planetary wheel holder functions as a supporting arrangement, which retains the worm wheel in mesh with the worm. Further, the planetary wheels are in mesh with a toothed rim with internal teeth, which surrounds the planetary wheel holder with planetary wheels. As the toothed rim is fixed in the gear housing, the toothed rim further functions as a supporting arrangement, which retains the worm wheel in mesh with the worm.

In a further embodiment the toothed rim is constructed as a separate ring with internal teeth. This is a simple solution, which results in an uncomplicated construction, which still has the desired strength properties. The solution is further inexpensive to produce due to simplified units, but also minimized work routines during the production.

Expediently, the gear housing is of a plastics material and does therefore not have the same strength qualities as a housing of metal. Production-related, there are, however, great advantages, as the housing may be constructed as one separate part and thus eliminates some time consuming and trivial assembly work. For that reason the gear housing will also be simpler and less voluminous. By constructing the toothed rim of metal, it contributes to stabilizing the gear housing. That the toothed rim, which is ring shaped, is separate, results, in terms of production, in it being more inexpensive and easier to manufacture. Further, the assembly of the planetary gear in the gear housing is particularly simple in that the separate toothed rim in one single step may be mounted in the gear housing without use of tools.

Before mounting the toothed rim in the gear housing, the motor is mounted on the gear housing. The gear housing is equipped with an opening, which allows mounting of the motor on the gear housing, when the separate toothed rim is not mounted. This is practically achievable in that the blade of a screw driver partly may be inserted through an opening in the gear housing, and thus has room to securing a first screw in the assembly of the motor and the gear housing. Somewhere else in the gear housing there is a corresponding groove, however without penetrating the gear housing, for access to securing another screw for the assembly of the gear housing and the motor.

In connection with the opening for access to secure the first screw, an opening is constructed so that the separate toothed rim completely covers this when the toothed rim is mounted in the gear housing. This means that the gear mechanism is shielded and protected, but also that the lubricants, which are applied to the gear mechanism, are encased in the gear housing.

The toothed rim is inserted as an inner rim in the gear housing in guides for that purpose, where corresponding pins are constructed on the toothed rim. The guides with their counter parts in the form of pins thus functions as cooperating means for securing against rotation, which retain the separate toothed rim against rotation in its position in the gear housing. This is important as the toothed rim otherwise merely would rotate in the gear housing and release the gear mechanism.

The gear housing is further equipped with a stop, which secures the separate toothed rim in its position in the longitudinal direction of the gear housing in one direction. In the other direction the housing is constructed so that it serves as a stop for movement of the toothed rim. In this way the toothed rim, although separate in nature, is completely locked in its position in the gear housing and thus also in its position in connection with the planetary gear.

In that the gear housing is made of a plastics material, moulded as a unit, this can be done in a simpler manner. When the toothed rim, of metal to provide strength, is inserted into the gear housing in guides for that purpose, a compact unit is achieved, where the requirements for strength and form stability are also met. Production-related, the unit is advantageous as the components are simpler and more inexpensive and it especially results in a less complicated assembly process.

BRIEF DESCRIPTION OF THE DRAWINGS

A linear actuator according to the invention will be described more fully below with reference to the accompanying drawings, in which.

DETAILED DESCRIPTION OF THE PREFERRED EMBODIMENTS

Figure 1:
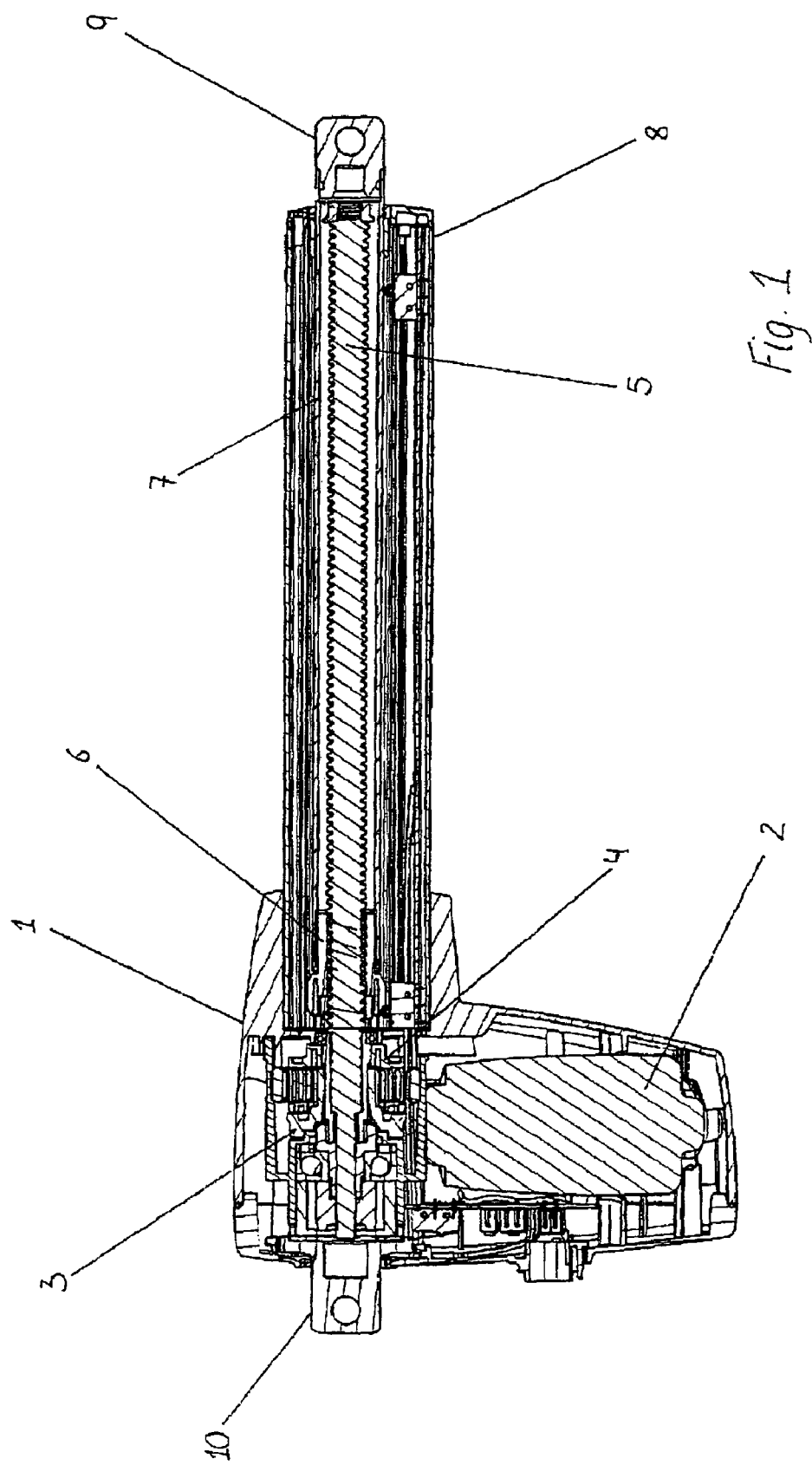
FIG. 1 shows a longitudinal section through an actuator.

As it appears from FIG. 1, the main components of the actuator are composed of a cabinet 1 comprising a reversible low-voltage DC motor 2, which over a worm drive 3 and a planetary gear 4 drives a spindle 5 with a spindle nut 6, on which is secured a tubular activation element 7 (inner tube) surrounded and guided in an outer tube 8. The actuator is further equipped with a front mounting 9 at the outer end of the activation element and a rear mounting 10 at the rear end of the cabinet 1.

Figure 2:
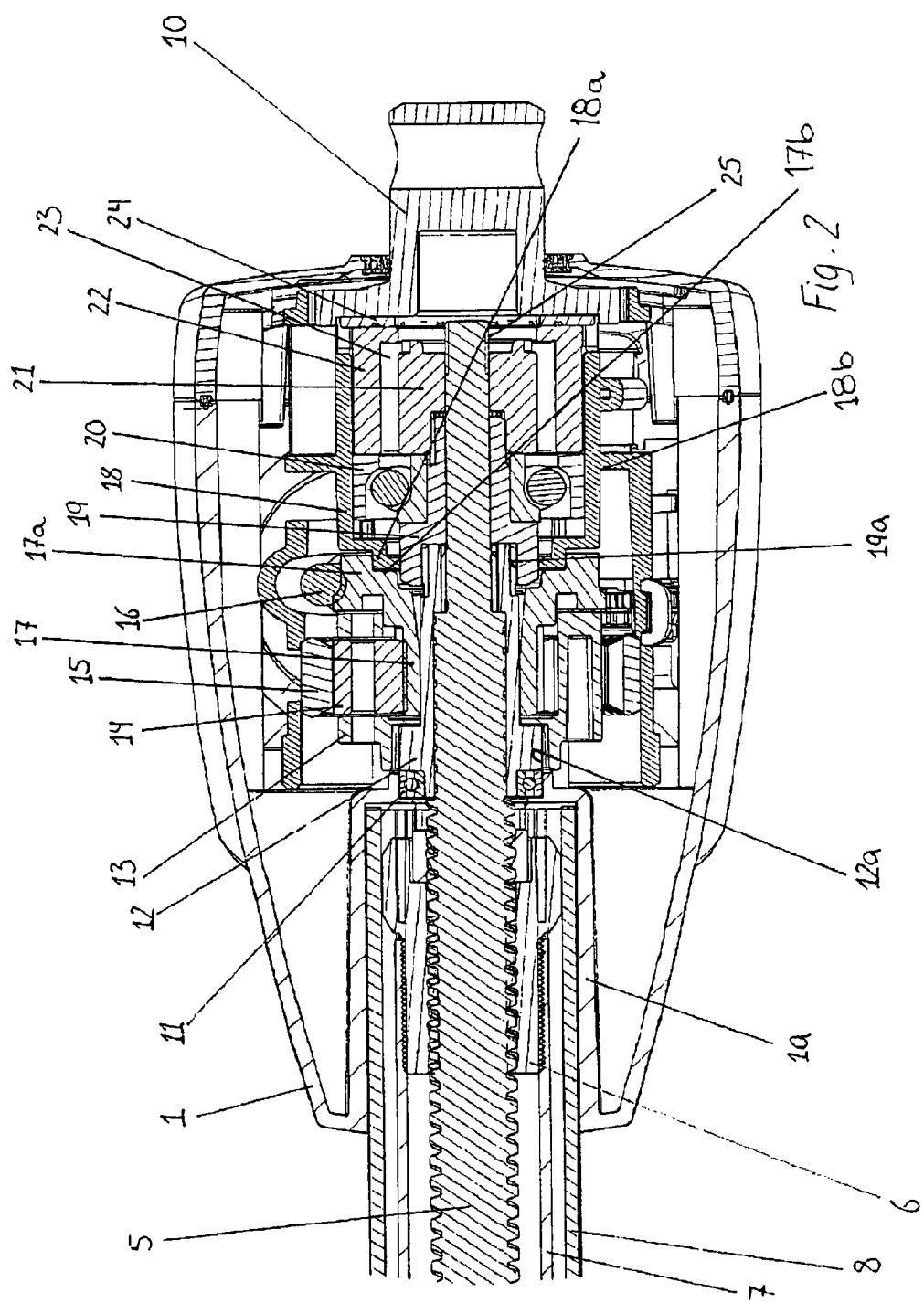
FIG. 2 shows an enlarged cross section through the rear end of the actuator seen from above in FIG. 1.

FIG. 2, shows a detailed view of the transmission. The spindle 5, with the spindle nut 6 secured to the activation element 7, is mounted in the outer tube 8, which is secured to the cabinet 1 in a tubular hollow 1a, adapted to the outer tube 8 as a snug fit. A bushing 12, which is secured against rotation relative to the spindle 5, is embedded in the cabinet 1 in a bearing 11, which thus has a centering effect on the spindle 5 in connection with the outer tube 8. The bushing 12 and the planetary wheel holder is designed with a spline connection 12a, which secures the planetary wheel holder 13 against rotation around the bushing 12 and thus also against rotation around the spindle. The rotation of the spindle 5 is thus locked to the rotation of the planetary wheel holder 13. In that the bushing 12 transfers the rotation via a spline connection the spindle 5 is axially displaceable relative to the planetary wheel holder 13, which means that the axial forces running from the front mounting 9 via the activation element 7 and the spindle nut 6 to the rear mounting 10 through the spindle 5, are not transferred to the transmission. As regards the planetary gear 4, both the sun wheel 17, the planetary wheel holder 13 with planetary wheels 14 and a toothed rim 15 are secured in their positions relative to a gear housing 18 in that the parts appear as mutually functioning support arrangements. Furthermore, the bushing 12 is over a distance of the length processed so that it functions as a slide bearing for the worm wheel 17a, driven by the worm 16 on the electric motor 2. The worm wheel 17a is further embedded in the gear housing 18 in that a recess 17b on one side thereof is designed to fit a collar 18a on a cross wall 19b in the gear housing 18 around the hole in the gear housing 18, where the spindle 5 is lead through. A bushing shaped extension 19 is connected to the bushing 12 and secured against rotation relative to this in that a spline connection 19a is constructed between the two parts. The extension 19 is also adapted to carry a bearing 20, which is a thrust bearing. A distance piece 21 is mounted in connection with the intermediate rim on the bearing 20. This distance piece 21 is axially secured to the shaft end of the spindle by means of a not shown nut, as the outer end of the shaft end is equipped with thread 25. A brake unit comprising a cup shaped cylinder 22 is mounted in connection with the outer ring on the bearing 20. A needle bearing 23 in the ring-shaped slot connects the distance piece 21 to the cup shaped cylinder 22, where the needle bearing 23 is constructed so that it only allows rotation in one direction. When the motor is cut off and a load attempts to rotate the spindle, the cup-shaped cylinder 22 will via the bearing be locked to the spindle via the distance piece 21 and thus be brought to rotate and move relative to a secured brake disc 24 between the bottom of the cup-shaped cylinder 22 and an end wall on the rear mounting 10 and in that way create friction against this and achieve a braking effect when the load attempts to rotate the spindle. By that means the activation element 7 is secured in its position when the motor is cut off. The frictional force is, however, not so large that it cannot be overcome by the motor when the activation element is pulled inwards, i.e. the load is lowered. When the load is lifted i.e. the activation element is displaced outwards, the needle bearing 23 causes the distance piece 21 and thus the spindle to rotate independently of the cup-shaped cylinder 22 and the brake remains inactive. In that the brake disc 24 is connected to the rear mounting 10, it is ensured that the axial forces are lead from the spindle 5 through the bearing 20 and the cup-shaped cylinder 22 of the brake unit to the brake disc 24 and subsequently to the rear mounting 10. The axial displacement of the bushing 12 relative to the spindle 5 ensures that the axial forces are not lead through the planetary gear but through the spindle 5 and on to the bearing 20 and the rear mounting 10, and a positive effect of the axial displacement of the spindle 5 is further that the braking effect is not changed as a result of wearing of the brake disc 24. As the spindle 5 can move axially, it will always be in good contact with the bearing 20 and as the bearing 20 also can be displaced in its cup, the displacement will cause the brake disc 24 always to be loaded by the load, which the actuator is subjected to, whether or not the brake disc 24 is worn and does not have its original thickness. If the braking effect should be insufficient, a further brake disc may be placed between the bearing 20 and the cup-shaped cylinder 22.

The gear mechanism is incidentally characterized thereby that the various components mutually support each other. This results in greater strength and less wearing along with a more silent operation.

As mentioned earlier, a collar 18a is designed on the transversal wall 18b in the gear housing, which serves as a support arrangement for the driven gear wheel in the form of the worm wheel 17a, which also drives the sun wheel 17 in the transmission, as the sun wheel 17 is constructed as an integrated part on the side of the worm wheel 17a. The worm wheel 17a has a recess 17b on one side which fits over the collar 18a on the wall 18b in the gear housing. It further appears that the worm 16 on the electric motor 2 is in mesh with the worm wheel 17a. The construction of the collar 18a in connection with the recess 17b is fitted to each other so that the collar 18a constitutes a support arrangement for the worm wheel 17a and secures this in mesh with the worm 16. Further, the wall 18b also functions as support during the assembly process.

The spindle 5 is further lead through the worm wheel 17a and is equipped with a bushing 12, on which the worm wheel 13 is embedded, as the bushing 12, which is secured to the spindle 5, functions as a slide bearing in connection with the worm wheel 17a. The bushing 12 thus supports and centers the worm wheel 17a so that this is kept in mesh with the worm 16. The bushing 12 is at the front supported by a bearing 11. The bushing 12 is furthermore extended with a bushing-shaped extension 19, which cooperates with the bushing 12 for support of the worm wheel 17a. The support effect is achieved in that the bushing-shaped extension 19 is embedded in the cabinet with the bearing 20.

The combined sun wheel/worm wheel 17, 17a is secured in the gear mechanism by means of the planetary wheel holder 13 with planetary wheels 14. The planetary wheel holder 13 is further connected to the spindle 5 via the bushing 12, which forms a spline connection between the two parts. As the bushing 12 is secured against rotation around the spindle 5 and the planetary wheel holder 13 correspondingly is secured against rotation relative to the bushing 12, the planetary wheel holder 13 functions as a support arrangement for the sun wheel/worm wheel 17,17a, which holds the worm wheel 17a in mesh with the worm 16.

The toothed rim 15, with internal teeth, which is mounted in the gear housing 18 surrounds the planetary wheel holder 13 with planetary wheels 14 and thus contributes to securing the planetary wheel holder 13 in its position, for which reason the toothed rim 15 also functions as a support arrangement, which holds the worm wheel 17a in mesh with the worm 16.

As the spindle 5, moreover, is embedded in the ball bearing 20, which is connected to the spindle 5 via the intermediate bushing 21, the embedment of the spindle 5 functions as a support arrangement which holds the worm wheel 13 in mesh with the worm 15.

Figure 3:
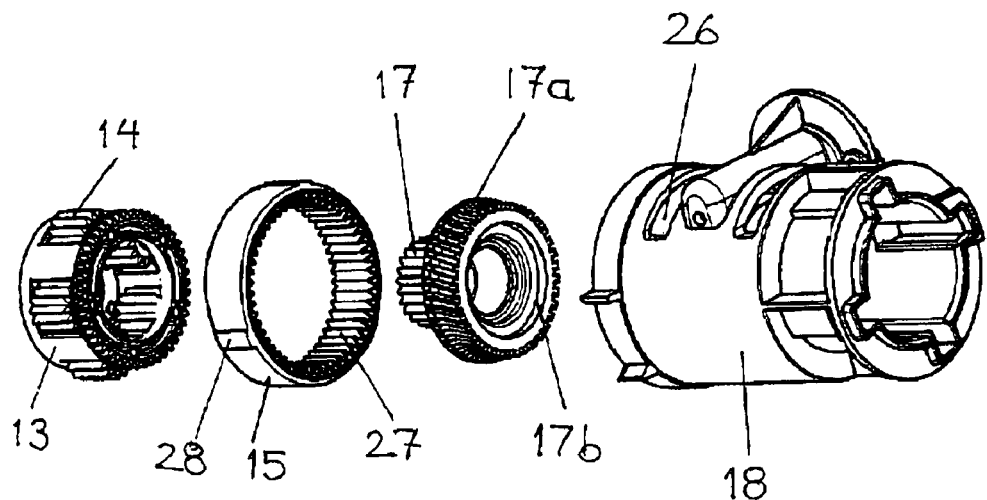
FIG. 3 shows an exploded view of a gear housing and the planetary gear seen from the rear end of the actuator.

FIG. 3, shows the gear housing 18 and the individual main components in the planetary gear such as the sun wheel 17 and the planetary wheel holder 13 with planetary wheels 14. In the gear housing 18 is also shown an opening 26, which allows for the electric motor 2 to be mounted in its position on the gear housing 18 with a tool, typically a screw driver, by means of a screw. The gear housing 18 is incidentally in its construction optimized to be manufactured as a injection-moulded unit in a plastics material, typically polyamide with a fiber reinforcement. The sun wheel 17 and the planetary wheel holder 13 with planetary wheels 14 are likewise made of a plastics material.

Figure 4:
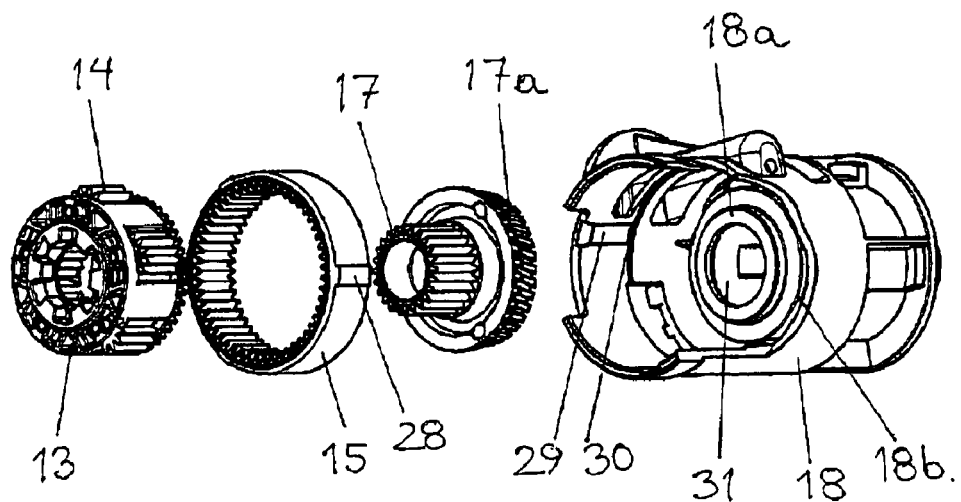
FIG. 4 shows the same as FIG. 3, but seen from the front and where a part of the side wall in the gear housing has been removed so that the cross wall thereof is visible.

FIG. 4 shows like FIG. 3 the gear housing 18 and the individual main components in the planetary gear, but seen from another angle. Moreover, a section is provided in the side wall of the housing so that the transversal wall 18b is visual. As it appears from the cross section in FIG. 2, the transversal wall 18b has a dome-shaped cylindrical part with a hole in the middle surrounded by the collar 18a. The dome-shaped part is with supporting ribs supported against the inner side of the gear housing. As regards the separate toothed rim 15, it is of metal, preferably sinter metal, and equipped with internal teeth 27. The toothed rim 15 is on the outer side equipped with pins 28 which, in mesh with guide 29 in the form of tracks internally in the gear housing 18, serve for locking the toothed rim 15 against rotation in its position in the gear housing 18.

The separate toothed rim 15 is further secured in the gear housing 18 in that there in the gear housing 18 is a stop 30, which limits the introducing of the toothed rim 15 in the longitudinal direction of the gear housing 18. As it appears from FIG. 1, the stop in the other direction is constituted by a part of the cabinet 1, which is constructed to form a plug in the entrance of the gear housing 18, when the cabinet is assembled around the gear housing and thus secures the separate toothed rim 15 in its position in the longitudinal direction of the gear housing 18.

A detail which clearly appears from FIG. 3 is the recess 17b, which is constructed on the worm wheel 17a on the side opposite the sun wheel 17. This recess 17b fits perfectly over the cup-shaped flange 18a, which as shown in FIG. 4 is constructed around the hole 31 in the transversal wall of the gear housing 18, and thus functions as a support arrangement for the worm wheel 17a.

The invention claimed is:

1. A linear actuator comprising:
   an electric motor (2),
   a gear housing (18),
   a transmission comprising a planetary gear (4) with a sun wheel (17), a planetary wheel holder (13) with planetary wheels (14) in mesh with the sun wheel (17) and a tooth rim (15) in the gear housing (18), where the planetary wheels (14) are in mesh with the toothed rim (15);
   a spindle (5) in connection with the transmission,
   a spindle nut (6) on the spindle,
   a bearing (20) for embedding a shaft end of the spindle (5), wherein the shaft end of the spindle (5) is lead freely through the transmission and connected to the bearing (20), and where the connection between the shaft end of the spindle (5) and the transmission allows a mutual axial movement so that axial forces are only lead through the spindle bypassing the transmission and directly to the bearing (20).

2. The linear actuator according to claim 1, including a rear mounting (10) and the bearing (20) is located in the gear housing (18) between the transmission and the rear mounting (10) directly or indirectly.

3. The linear actuator according to claim 1, wherein the connection between the planetary wheel holder (13) and the spindle (5) is an axially displaceable connection secured against rotation constructed so that the planetary wheel holder (13) may be displaced in the longitudinal direction relative to the spindle (5) while the planetary wheel holder (13) and the spindle (5) are mutually secured against rotation.

4. The linear actuator according to claim 1, wherein the sun wheel (17) of the planetary gear is embedded on a shaft end of the spindle (5).

5. The linear actuator according to claim 3, wherein the connection between the planetary wheel holder (13) and the spindle (5) comprises a bushing (12) on the shaft end of the spindle (5), and the shaft end and the bushing (12) over at least part of the length of the bushing (12) have means for mutual securing against rotation, and the bushing (12) moreover has means for securing the planetary wheel holder (13) against rotation relative to the bushing (12).

6. The linear actuator according to claim 3, wherein the bushing (12) forms a stop for movement of the planetary wheel holder (13) in at least one axial direction.

7. The linear actuator according to claim 4, wherein the bushing (12), at least over a distance functions as a slide bearing for the sun wheel (17), embedded on the bushing (12).

8. The linear actuator according to claim 7, wherein the sun wheel (17) is embedded in connection with a wall (18*b*) in the gear housing (18) and that the bushing (12) is lead through the wall and on the other side of the wall is in connection with an extension (19), connected to the bushing (12) by means of a spline connection, securing the bushing (12) and the extension (19) against mutual rotation.

9. The linear actuator according to claim 8, wherein the bearing (20) is in connection with the extension (19).

10. The linear actuator according to claim 9, wherein a braking device (22) having at least one brake disc (24) is located in connection with the bearing (20) and the rear mounting (10) and performs a braking effect in at least one rotational direction of the spindle (5), and the braking force does not change or noticeable change as the braking disc (24) is worn, as the spindle (5) is axially displaceable in the transmission.

11. The linear actuator according to claim 1, wherein the wall (18*a*) in the gear housing (18) and the driven gear wheel (17) is constructed so that the wall (18*a*) functions as a centering and support for the gear wheel (17).

12. The linear actuator according to claim 11, wherein the transmission further comprises a worm gear, where the worm wheel (17*a*) is interconnected with the sun wheel (17) in the worm gear and the worm wheel (17*a*) is in mesh with a worm (16) driven by the electric motor (2).

13. The linear actuator according to claim 11, wherein the worm wheel (17*a*); on the side facing the transversal wall (18*b*) in the gear housing (18), is designed with a recess or collar (17*b*) around its axial center line, which is in connection with a cylindrical counter part (18*a*) constructed in the transversal wall (18*b*) in the gear housing (18) or vice versa.

14. The linear actuator according to claim 1, wherein the toothed rim (15) is a separate ring having internal teeth (27) secured against rotation in the gear housing (18).

15. The linear actuator according to claim 14, wherein the mutual means for securing against rotation consist of at least one pin or list (28) on the outside of the separate toothed rim (15) and at least one counter part in the form of one or more axially running guides or tracks (29) on the inner side of the gear housing (18) or vice versa, and has a stop (30) which determines the position of the separate toothed rim (15) in the longitudinal direction of the gear housing (18).

* * * * *